United States Patent
Lien et al.

(10) Patent No.: US 12,241,316 B2
(45) Date of Patent: Mar. 4, 2025

(54) METHODS AND SYSTEMS FOR EARTH DRILLING

(71) Applicant: MHWIRTH AS, Kristiansand (NO)

(72) Inventors: Geir Lien, Hoevag (NO); Petter Mydland, Kristiansand S (NO)

(73) Assignee: MHWIRTH AS, Kristiansand (NO)

( * ) Notice: Subject to any disclaimer, the term of this patent is extended or adjusted under 35 U.S.C. 154(b) by 0 days.

(21) Appl. No.: 18/212,723

(22) Filed: Jun. 22, 2023

(65) Prior Publication Data

US 2023/0374871 A1    Nov. 23, 2023

Related U.S. Application Data

(63) Continuation of application No. 17/442,637, filed as application No. PCT/NO2020/050088 on Mar. 26, 2020, now Pat. No. 11,725,469.

(30) Foreign Application Priority Data

Mar. 27, 2019 (GB) .................................... 1904228
Sep. 13, 2019 (GB) .................................... 1913257
(Continued)

(51) Int. Cl.
*E21B 17/00* (2006.01)
*B25J 5/00* (2006.01)
(Continued)

(52) U.S. Cl.
CPC .............. *E21B 19/16* (2013.01); *B25J 5/007* (2013.01); *B25J 15/0028* (2013.01);
(Continued)

(58) Field of Classification Search
CPC ...... E21B 19/16; E21B 19/155; E21B 17/006; B25J 5/007; B25J 15/028; B25J 15/0253; F16L 1/06; F16L 57/055
See application file for complete search history.

(56) References Cited

U.S. PATENT DOCUMENTS 1,899,379 A * 2/1933 Adams .................... B08B 9/023
                                                    144/208.7
2,575,649 A    11/1951 Abegg
(Continued)

FOREIGN PATENT DOCUMENTS

CA         1 165 544 A    4/1984
CN       203357446 U     12/2013
(Continued)

*Primary Examiner* — Taras P Bemko
(74) *Attorney, Agent, or Firm* — Norman B. Thot

(57) ABSTRACT

A cleaning apparatus for cleaning a drill string. The cleaning apparatus includes a base, an arm, a fluid flow conduit, and a motor. The base supports the arm on a drill floor of a drilling rig. The arm has a first end which is mounted on the base, a second end at which a spray nozzle is arranged, and at least one articulated joint via which the arm, or a portion of the arm, can pivot relative to the base. The fluid flow conduit is connected to the spray nozzle so that a pressurized fluid entering the fluid flow conduit can spray out of the spray nozzle. The motor pivots the arm about the at least one articulated joint so as to alter an orientation of the spray nozzle relative to the base.

19 Claims, 4 Drawing Sheets

(30) Foreign Application Priority Data

| Oct. 16, 2019 | (GB) | 1914955 |
|---|---|---|
| Oct. 23, 2019 | (GB) | 1915306 |
| Dec. 5, 2019 | (GB) | 1917797 |

(51) Int. Cl.
*B25J 15/00* (2006.01)
*B25J 15/02* (2006.01)
*E21B 19/15* (2006.01)
*E21B 19/16* (2006.01)
*F16L 1/06* (2006.01)
*F16L 57/00* (2006.01)

(52) U.S. Cl.
CPC ......... *B25J 15/0253* (2013.01); *E21B 17/006* (2013.01); *E21B 19/155* (2013.01); *F16L 1/06* (2013.01); *F16L 57/005* (2013.01)

(56) References Cited

U.S. PATENT DOCUMENTS

| 2,696,039 | A | 12/1954 | Baker |
| 4,397,605 | A | 8/1983 | Cowgill et al. |
| 4,442,737 | A | 4/1984 | Miner |
| 5,318,254 | A | 6/1994 | Shaw et al. |
| 5,524,672 | A | 6/1996 | Mosing et al. |
| 5,833,147 | A | 11/1998 | Fuhlbrigge |
| 6,565,668 | B1 | 5/2003 | Sandberg et al. |
| 2005/0082857 | A1 | 4/2005 | Latiolais, Jr. et al. |
| 2007/0236004 | A1 | 10/2007 | Benedict |
| 2008/0093091 | A1 | 4/2008 | Mong et al. |
| 2011/0126677 | A1 | 6/2011 | Buchanan |
| 2012/0097454 | A1 | 4/2012 | Kockeis et al. |
| 2013/0153303 | A1* | 6/2013 | Angelle .............. B08B 9/023 175/84 |
| 2014/0231076 | A1 | 8/2014 | Brown |
| 2015/0209940 | A1 | 7/2015 | Kroll |
| 2019/0003269 | A1 | 1/2019 | Skjærseth et al. |
| 2019/0143440 | A1* | 5/2019 | Akita ................ G05B 19/418 134/198 |
| 2020/0040673 | A1 | 2/2020 | Donnally et al. |
| 2023/0323736 | A1* | 10/2023 | Krogh ................ E21B 37/02 15/104.04 |

FOREIGN PATENT DOCUMENTS

| CN | 213793265 U | * | 7/2021 |
| CN | 115538981 A | * | 12/2022 |
| GB | 615015 A | | 12/1948 |
| GB | 2 014 102 A | | 8/1979 |
| GB | 2 391 799 A | | 2/2004 |
| GB | 2577290 A | | 3/2020 |
| WO | WO 93/00261 | | 1/1993 |
| WO | WO 2014/031969 A1 | | 2/2014 |
| WO | WO 2016/199103 A1 | | 12/2016 |
| WO | WO 2020/028852 A1 | | 2/2020 |
| WO | WO 2020/028853 A1 | | 2/2020 |

* cited by examiner

METHODS AND SYSTEMS FOR EARTH DRILLING

CROSS REFERENCE TO PRIOR APPLICATIONS

This application is a continuation of application Ser. No. 17/442,637, filed on Sep. 24, 2021, which is a U.S. National Phase application under 35 U.S.C. § 371 of International Application No. PCT/NO2020/050088, filed on Mar. 26, 2020 and which claims benefit to Great Britain Patent Application No. GB 1904228.2, filed on Mar. 27, 2019, to Great Britain Patent Application No. GB 1913257.0, filed on Sep. 13, 2019, to Great Britain Patent Application No. GB 1914955.8, filed on Oct. 16, 2019, to Great Britain Patent Application No. GB 1915306.3, filed on Oct. 23, 2019, and to Great Britain Patent Application No. GB 1917797.1, filed on Dec. 5, 2019. The International Application was published in English on Oct. 1, 2020 as WO 2020/197412 A1 under PCT Article 21(2).

FIELD

The present invention relates to earth drilling, and particularly to methods and systems for carrying out operations for earth drilling.

BACKGROUND

Drilling rigs have a platform directly under a derrick which provides a work area in which the rig crew can work. The driller's cabin, from which the major components of the rig are controlled, is located adjacent the drill floor.

The drill floor is the most dangerous location on a drilling rig because of the heavy equipment which is moved around the area, yet many tasks associated with the running of a drilling operation are currently carried out manually by personnel working on the drill floor. The most dangerous area of the drill flow is known as the red zone.

In drilling operations, it is common to build a string of tubulars, such as a drill string, on the drill floor above the well centre opening. The string is usually assembled using a series of threaded pipe sections, where the threaded connections are made up (or broken out) using appropriate machines, such as pipe handling machines and power tongs. A bottom hole assembly (BI-HA) including a drill bit, is mounted at the lowermost end of the drill string.

Documents which may be useful to understand the field of technology include U.S. Pat. No. 2,696,039; WO 2014/031969 A1; US 2011/126677; US 2007/236004 A1; U.S. Pat. No. 4,442,737; CA 1165544; U.S. Pat. No. 5,524,672; US 2005/0082857 A1; WO 2016/199103; GB2391799; WO9300261; U.S. Pat. No. 6,565,688; and GB 2014102.

SUMMARY

An aspect of the present invention is to improve the reliability, operational lifetime and operational efficiency of processes and machines on drilling rigs. At the same time, health and safety requirements remain stringent for such operations, and there is a need for improved solutions which reduce the risk for personnel. The present invention has the objective to provide improved systems and methods in the abovementioned or other areas.

In an embodiment, the present invention provides a cleaning apparatus for cleaning a drill string. The cleaning apparatus includes a base, an arm, a fluid flow conduit, and a motor. The base is configured to support the arm on a drill floor of a drilling rig. The arm comprises a first end which is mounted on the base, a second end at which a spray nozzle is arranged, and at least one articulated joint via which the arm, or a portion of the arm, can pivot relative to the base. The fluid flow conduit is connected to the spray nozzle so that a pressurized fluid entering the fluid flow conduit can spray out of the spray nozzle. The motor is configured to pivot the arm about the at least one articulated joint so as to alter an orientation of the spray nozzle relative to the base.

BRIEF DESCRIPTION OF THE DRAWINGS

The present invention is described in greater detail below on the basis of embodiments and of the drawings in which.

DETAILED DESCRIPTION

Figure 1:
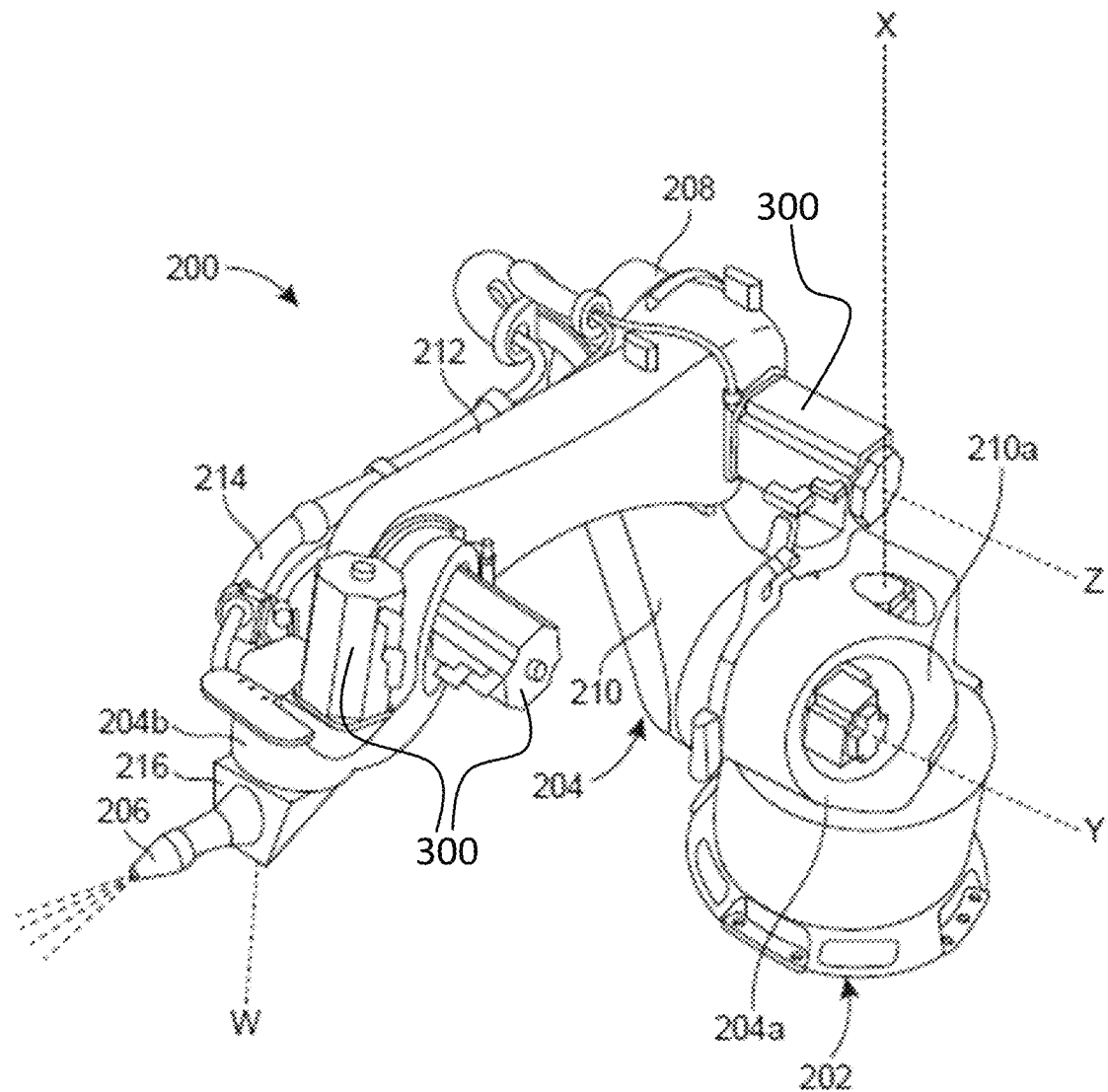
FIG. 1 is an illustration of an apparatus according to the present invention.

The present invention provides a cleaning apparatus and method for cleaning a drill string.

The apparatus may have a base and an arm, the base being configured to support the arm on a drill floor of a drilling rig, the arm having a first end which is mounted on the base, a second end at which is provided with a spray nozzle and at least one articulated joint by means of which the arm, or a portion of the arm may pivot relative to the base, the apparatus further comprising a fluid flow conduit which is connected to the nozzle so the pressurised fluid entering the fluid flow conduit can spray out of the spray nozzle, and a motor which is operable to pivot the arm about the articulated joint to alter the orientation of the spray nozzle relative to the base.

The articulated joint may form a pivotal connection between the arm and the base.

The arm may comprise a first and second portion which are joined by the articulated joint. In this case, the first end of the arm may also be pivotally mounted on the base.

The spray nozzle may be mounted on a holder which is pivotally connected to the second end of the arm, and the motor operable to pivot the spray nozzle relative to the arm.

The motor may be hydraulically operable.

The cleaning apparatus may further be provided with a controller which is operable to control the operation of the motor, and which is remote from the remainder of the cleaning apparatus.

The base may comprise wheels or tracks which, when the base is resting on a drill floor of a drilling rig are operable to move the base and arm around the drill floor.

The spray nozzle may comprise at least two spray pails each of which extends around a portion of a nozzle axis and is provided with a plurality of fluid exit apertures which are arranged so that fluid ejected from the exit apertures forms jets generally towards the nozzle axis from a plurality of different directions, the two spray parts being spaced from one another in a direction generally parallel to the nozzle axis.

The motor may be operable to pivot the spray nozzle between a first position and a second position, the nozzle axis rotating through approximately 90° during pivoting of the spray nozzle between the first position and second position.

A method of washing a drilling string comprising a plurality of pipe sections joined end to end may comprise:
a) using an elevator to lift the drill string through an aperture in drill floor,
b) using a cleaning apparatus placed with its base on top of the drill floor to spray cleaning fluid onto the first pipe section as it is lifted including operating a motor of the cleaning apparatus to move the spray nozzle relative to the drill floor in order to direct the cleaning fluid onto a plurality of areas of the pipe section.

The method may further comprise:
c) using the elevator to lift the drill string so that a joint between a first, uppermost, pipe section and a second pipe section directly below the first pipe section is above the drill floor,
d) setting slips so that the uppermost end of the second pipe section is supported by the drill floor,
e) disconnecting the first pipe section from the second pipe section,
f) using the cleaning apparatus placed with its base on top of the drill floor to spray cleaning fluid onto the lowermost end of the first pipe section including operating a motor of the cleaning apparatus to move the spray nozzle relative to the drill floor in order to direct the cleaning fluid onto a plurality of areas of the pipe section.

The method may further comprise:
g) moving the first pipe section from its elevated position above the second pipe section,
h) using the cleaning apparatus placed with its base on top of the drill floor to spray cleaning fluid onto the uppermost end of the second pipe section including operating a motor of the cleaning apparatus to move the spray nozzle relative to the drill floor in order to direct the cleaning fluid onto a plurality of areas of the pipe section.

The method may further comprise:
i) connecting the uppermost end of the second pipe section to the elevator,
j) releasing the slips and using the elevator to lift the second pipe section through the aperture in the drill floor, and
k) using the cleaning apparatus placed with its base on top of the drill floor to spray cleaning fluid onto the second pipe section as it is lifted including operating a motor of the cleaning apparatus to move the spray nozzle relative to the drill floor in order to direct the cleaning fluid onto a plurality of areas of the pipe section.

The second pipe section may comprise a bottom hole assembly having a drill bit.

Any of steps b, f, h and k may comprise pivoting the articulated joint in order to move the spray nozzle relative to the base. Any of steps b, f, h and k may comprise pivoting the articulated joint in order to move the spray nozzle relative to the base around at least a portion of the circumference of the pipe section.

The base of the cleaning apparatus may comprise wheels or tracks which, when the base is resting on a drill floor of a drilling rig are operable to move the base and arm around the drill floor, and any of steps b, f, h and k may comprise operating the wheels or tracks to move the cleaning apparatus around the pipe section in order to spray cleaning fluid into a plurality of sides of the pipe section.

Any one of steps b, f, h, or k may comprise operating the motor of the cleaning apparatus to move the spray nozzle in a reciprocating manner in a direction generally parallel to a longitudinal axis of the drill string.

Where the motor is operable to pivot the spray nozzle between a first position and a second position, the nozzle axis rotating through approximately 90° during pivoting of the spray nozzle between the first position and second position, any one of steps b, f, h or k may comprise operating the motor to pivot the spray nozzle to an engage/release position in which the nozzle axis is generally perpendicular to the longitudinal axis of the drill string, operating the arm motor to move the spray nozzle towards the drill string so that the drill string lies between the two spray parts, and then operating the arm motor to pivot the spray nozzle to an operative position in which the nozzle axis is generally parallel to or coincident with the longitudinal axis of the drill string.

We further provide a method of cleaning an elongate part having an longitudinal axis using a cleaning apparatus wherein the motor is operable to pivot the spray nozzle between a first position and a second position, the nozzle axis rotating through approximately 90° during pivoting of the spray nozzle between the first position and second position, the method comprising operating the motor to pivot the spray nozzle to an engage/release position in which the nozzle axis is generally perpendicular to the longitudinal axis of the drill string, operating the motor to move the spray nozzle towards the drill string so that the drill string lies between the two spray parts, and then operating the motor to pivot the spray nozzle to an operative position in which the nozzle axis is generally parallel to or coincident with the longitudinal axis of the drill string.

The method may further comprise pumping cleaning fluid into the fluid flow conduit so that cleaning fluid sprays out of the spray nozzle when the spray nozzle is in the operative position.

The method may further comprise the step of operating the motor of the cleaning apparatus to move the spray nozzle in a reciprocating manner in a direction generally parallel to a longitudinal axis of the drill string whilst the spray nozzle is in the operative position and cleaning fluid is being pumped into the fluid flow conduit.

The following description may use terms such as "horizontal", "vertical", "lateral", "back and forth", "lip and down", "upper", "lower", "inner", "outer", "forward", "rear", etc. These terms generally refer to the views and orientations as shown in the drawings and that are associated with a normal use of the invention. The terms are used for the reader's convenience only and shall not be limiting.

Referring to FIG. 1, there is shown a cleaning apparatus 200 for cleaning a drill string, the apparatus 200 having a base 202 and an arm 204, the base 202 being configured to support the arm 204 on a drill floor of a drilling rig. The arm 204 has a first end 204a which is mounted on the base 202, a second end 204b at which is provided a spray nozzle 206 and at least one articulated joint 208 by means of which the arm 204, or a portion of the arm 204 may pivot relative to the base 202. The apparatus further comprises a motor (hereinafter referred to the arm motor 300) which is operable to pivot the arm 204 about the articulated joint 208 to alter the position of the spray nozzle 206 relative to the base 202.

In this embodiment, the arm 204 comprises a first portion 210 and second portion 212 which are joined by the articulated joint 208. In this example, the articulated joint is configured to allow the second portion 212 to pivot relative to the first portion 210 about an axis Z which is generally parallel to a surface on which the base 202 is supported (not shown). It will be appreciated that this need not be the case, however, and the articulated joint could equally comprise a pivotal connection between the first end 204a of the arm 204 and the base 202.

A first end 210a of first portion 210 of the arm 204 is pivotally mounted on the base 202. In this example, the first end 210a of the first portion 210 is pivotally connected to the base 202 to pivot relative to the base 202 about an axis X which is generally perpendicular to a surface on which the base 202 is supported. Moreover, in this embodiment, the joint between the first portion 210 and the base 202 is configure to allow the first portion 210 of the arm 204 to pivot relative to the base 202 about an axis Y which is generally parallel to a surface on which the base 202 is supported. This need not be the case, however. The first end 210a of the first portion 210 of the arm 204 could be fixed to the base, or pivotal about only one of these axes X, Y.

The arm motor 300 is operable to pivot the second portion 212 of the arm relative to the first portion 210 of the arm about the articulated joint 208, and to pivot the first portion 210 of the arm 204 relative to the base 202. In this embodiment, the arm motor 300 is operable to carry out pivoting of the arm 202 about each pivot axes, X, Y Z independently of the others, and may comprise a plurality of separate motors.

In this embodiment, the arm motor 300 is hydraulically operable.

The apparatus 200 further comprises a fluid flow conduit 214 which is connected to the spray nozzle 206 so the pressurised fluid entering the fluid flow conduit 214 can spray out of the spray nozzle 206. A valve system (not shown) is also provided to control flow of pressurised fluid along the fluid flow conduit 214 to the spray nozzle 206.

The fluid flow conduit 214 and valve system can be mounted on the arm 204, but need not be. It could, for example, comprise a hose which extends directly from a fluid source to an inlet port on the spray nozzle 206. The valve system may be mounted on the spray nozzle 206 to control flow of fluid from the hose into the inlet port, or be provided in the hose itself.

In this embodiment, the spray nozzle 206 is mounted on a holder 216 which is pivotally connected to the second end 204b of the arm 204, and the arm motor 300 is operable to pivot the spray nozzle 206 and holder 2016 relative to the arm 204, about an axis W which, in this example, is generally perpendicular to the second portion 212 of the arm 204.

Figure 2:
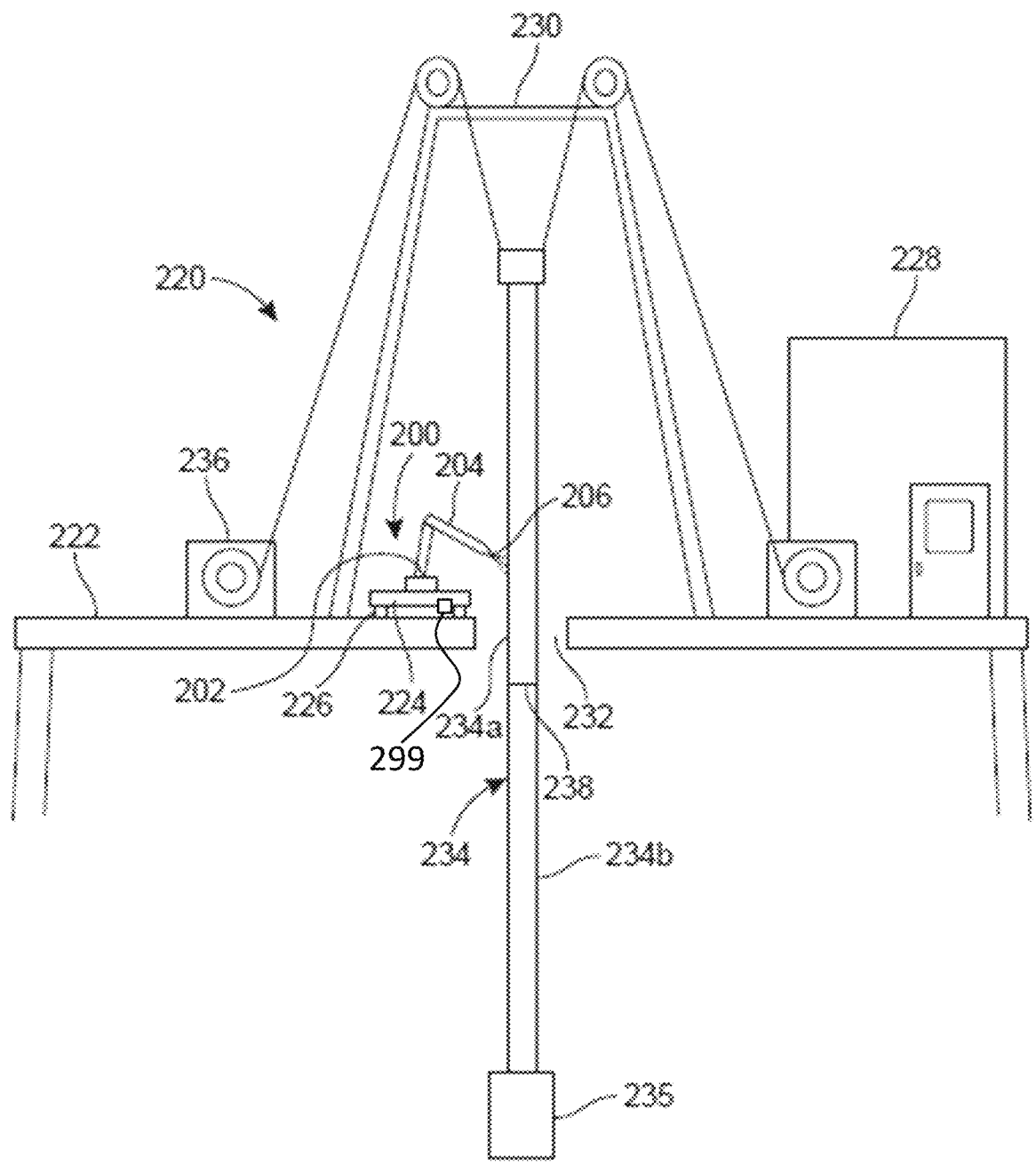
FIG. 2 is a schematic illustration of a drilling rig according to the present invention.

Referring now to FIG. 2, there is shown a drilling rig 220 having a drill floor 222 and a cleaning apparatus 200 as described above, on the drill floor 222. In this case, the base 202 is mounted on a trolley 224 which has wheels 226 which are operable to move the base 202 and arm 204 around the drill floor 222. It will be appreciated that the trolley could equally be provided by tracks, Mecanum or omni wheels, or any other suitable motive means for moving it around the drill floor.

Advantageously the wheels 226 are powered by a trolley motor 299 which operable remotely, for example, from a driller's cabin 228 adjacent the drill floor 222. In a preferred embodiment, the arm motor 300 provided to cause pivoting of the arm 204 about the various pivot axes X, Y, Z and the spray holder about axis W is also controlled remotely, preferably from the driller's cabin 228 also. Similarly means to control the operation of the valve system to control flow of fluid to the spray nozzle 206 remotely, preferably from the driller's cabin 228, is also provided.

This remote control may be achieved by a wired or wireless connection to the trolley motor 299 or arm motor 300, and valve system.

The fluid flow conduit 214 is connected to a source of pressurised water, for example the rig's high-pressure cleaning system.

The drill floor 222 is provided with a derrick 230 and an aperture 232 which is below the derrick 230, through which a drill string 234 extends. The drill string 234 is made up of a plurality of pipe sections 234a, 234b which are joined end to end. A bottom hole assemble (BELA) 235 is provided at the lowermost end of the lowest pipe section.

The drilling rig 220 is further provided with an elevator, or drawworks 236 by means of which the drill string 234 is suspended from the derrick 230. The drawworks 236 is operable to lower the drill string 234 in order to drill a wellbore, and to raise the drill string 234 to remove the drill string 234 from the wellbore.

The cleaning apparatus 200 may be used in the following way.

After drilling a section of wellbore, the drawworks 236 are operated to lift the drill string 234 through the aperture 232 in the drill floor 222, and the valve system is operated to allow flow of pressurised water to the spray nozzle 206 of the cleaning apparatus 200. The cleaning apparatus 200 is positioned, using the trolley motor 299, and the arm motor or motors 300 is/are operated, and the valve system operated to allow flow of pressurised water to the spray nozzle 206 so that the water spray from the spray nozzle 206 is directed onto the drill string 234 as it is lifted, in order to remove any chunks of clay or other debris from the outside of the drill string 234.

The trolley motor 299 may be operated to move the cleaning apparatus 200 around the drill string 234 as it is lifted, in order to clean all the way around the drill string 234. Alternatively, this may be achieved by operating the arm motors 300 to move the arm 204 around the drill string 234, or by a combination of arm and trolley movement. The arm motor or motors 300 may also be operated to move the spray nozzle 206 up and down along the longitudinal axis of the drill string 234 to improve the effectiveness of the water spray at cleaning the drill string 234.

The drawworks 236 may be operated to lift the drill string 234 so that a joint 238 between a first, uppermost, pipe section 234a and a second pipe section 234b directly below the first pipe section 234c is above the drill floor 222. Slips are then set around the upper end of the second pipe section 234b so that the uppermost end of the second pipe section 234b is supported by the drill floor 222, and the first pipe section 234a disconnected from the second pipe section 234b. Again, the cleaning apparatus 200 is positioned, using the trolley motor 299, and the arm motor or motors 300 is/are operated so that the water spray from the spray nozzle 206 is directed onto the joint at the lowermost end of the first pipe section 234a, in order to remove any chunks of clay or other debris from the outside of the joint 238.

The arm motor or motors 300 of the cleaning apparatus 200 may then be operated so that the water spray is directed onto the joint at the uppermost end of the second pipe section 234*b*.

Removal of dirt and debris from any threaded portion and seals of the joint 238 is particularly important to ensure the integrity of the joint 238 when the joint 238 is made up again in the future, as retained dirt or debris on the joint could damage the thread or seals.

As before, the trolley motor 299 may be operated to move the cleaning apparatus 200 around the drill string 234, in order to clean all the way around the joint 238. Alternatively, this may be achieved by operating the arm motors 300 to move the arm 204 around the drill string 234, or by a combination of arm and trolley movement. The arm motor or motors 300 may also be operated to move the spray nozzle 206 up and down along the longitudinal axis of the drill string 234 to improve the effectiveness of the water spray at cleaning the joints.

Once the joint 238 is cleaned, the first pipe section 234*a* may be detached from the draw works 236 and run to a storage destination such as the fingerboard, pipe deck or shop. The draw works 236 may then be attached to the uppermost end of the second pipe section 234*b*, the slips removed, and the draw works 236 operated to lift the second pipe section 234*b*. The cleaning apparatus 200 may then be operated as described above to clean the second pipe section 234*b* as it is lifted, and the process of cleaning the joint repeated for the joint at the lowermost end of the second pipe section 234*b* and the uppermost end of the pipe section below.

When the pipe section in the slips is the last in the drill string 234, and, as such, has the BHA 235 at its lowermost end, the BHA 235 may be cleaned by using the draw works 236 to lift the last pipe section so that the BHA is suspended above the drill floor 222. The cleaning apparatus 200 may then be used, as described above, to clean the BHA 235.

The cleaning apparatus 200 can also be used in a similar fashion to clean the hydraulic rough neck dieses and spinner rollers, and as the cleaning apparatus 200 can be operated remotely, the cleaning can be carried out without using personnel in the red zone.

Alternative embodiments of spray nozzle 240 which could be used in the cleaning apparatus 200 are illustrated in FIGS. 3-6. In these embodiments, the spray nozzle comprises at least two spray parts each of which extends around a portion of a nozzle axis and is provided with a plurality of fluid exit apertures which are arranged so that fluid ejected from the spray nozzle forms jets from exit apertures generally towards the nozzle axis from a range of directions, the two spray parts being spaced from one another in a direction generally parallel to the nozzle axis.

Figure 3:
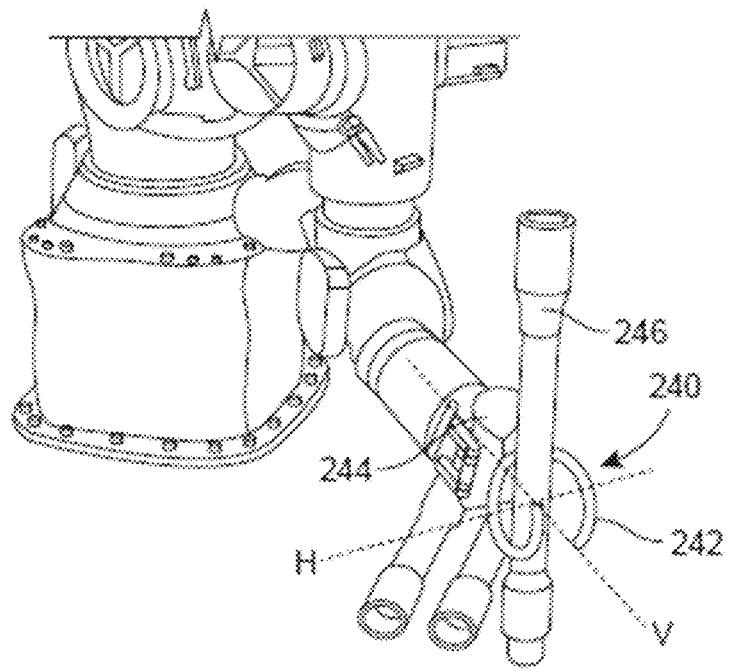
FIG. 3 is an illustration of an alternative embodiment of the spray nozzle suitable for use in the apparatus illustrated in FIG. 1 where the spray nozzle in an engage/release position.
Figure 4:
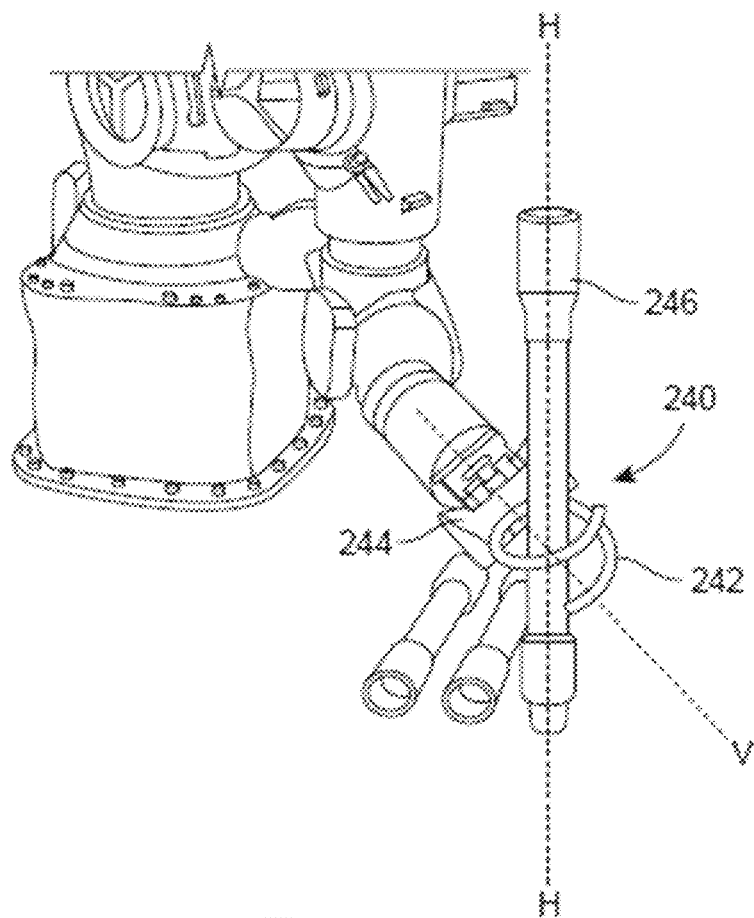
FIG. 4 is an illustration of an alternative embodiment of the spray nozzle suitable for use in the apparatus illustrated in FIG. 1 where the spray nozzle in an operative position.

In the first embodiment, illustrated in FIGS. 3 and 4, the spray nozzle 240 comprises a tube 242 which is curved to form part of a helix (in this example just over one turn of a helix), with an axis H. It will be appreciated, however, that the tube 242, need not be exactly helical, and may simply be curved around a generally nozzle axis H so that when viewed parallel to the nozzle axis H, the nozzle axis H is surrounded completely, or almost completely, by the tube 242.

Both ends of the tube 242 are closed, and the tube 242 is provided with a plurality of apertures on the portions of its surface facing nozzle axis H. An inlet port is provided in a portion of the surface of the tube 242 facing away from the axis H, and the inlet port connected to the fluid flow conduit 214, so that pressurised fluid from the fluid flow conduit 214 enters the tube 242 via the inlet port and exits in a series of radially inwardly directed jets. In this example, the inlet port is located generally centrally between the ends of the tube 242, but this need not be the case, and the inlet port could be at or closer to one of the ends of the tube 242.

The tube 242 is mounted on a holder 244 which is mounted on the end of the second portion 212 of the arm 204, the arm motor 300 being operable to pivot the holder 244 relative to the arm about an axis V which, in this case, is generally parallel to the second portion 212 of the arm 204. The tube 242 is arranged on the holder 244 such that the nozzle axis H of the tube 242 is generally perpendicular to the pivot axis V.

The cleaning apparatus 200 fitted with this embodiment of spray nozzle 240 may be used to clean around an elongate part 246 such as a wire, cable or tubular, by operating the arm motor 300 to pivot the holder 244, and/or the arm 204 or a portion thereof, such that the helix axis H of the tube 242 is perpendicular to the longitudinal axis of the elongate part 246 (the engage/release position), The arm motor 300 can then be operated move the spray nozzle 240 towards the elongate part 246 so that the elongate part 246 passes between the two ends of the tube 242 (as illustrated in FIG. 3) to a position in which the arm motor 300 can be operated to pivot the holder 216 and/or the arm 204 or a portion thereof so that the helix axis H of the tube 242 is either generally parallel, or more preferably coincident with the longitudinal axis of the elongate part 246, as illustrated in FIG. 4, In the latter position (hereinafter referred to as the operative position), when cleaning fluid is pumped along the fluid flow conduit 214 and into the tube 242, the cleaning fluid sprays out of the apertures onto the elongate part 246. As the tube 242 extends around the entire perimeter of the elongate part 246, cleaning fluid can be directed onto all parts of the outermost surface of the elongate part 246 simply by moving the elongate part 246 parallel to its longitudinal axis. To improve the cleaning effect, the arm motor 300 can be operated to move the spray nozzle 240 parallel to the longitudinal axis of the elongate part 246 in a reciprocating, up and down or back and forth manner whilst the elongate part 246 is moving parallel to its longitudinal axis or is stationary.

Figure 5:
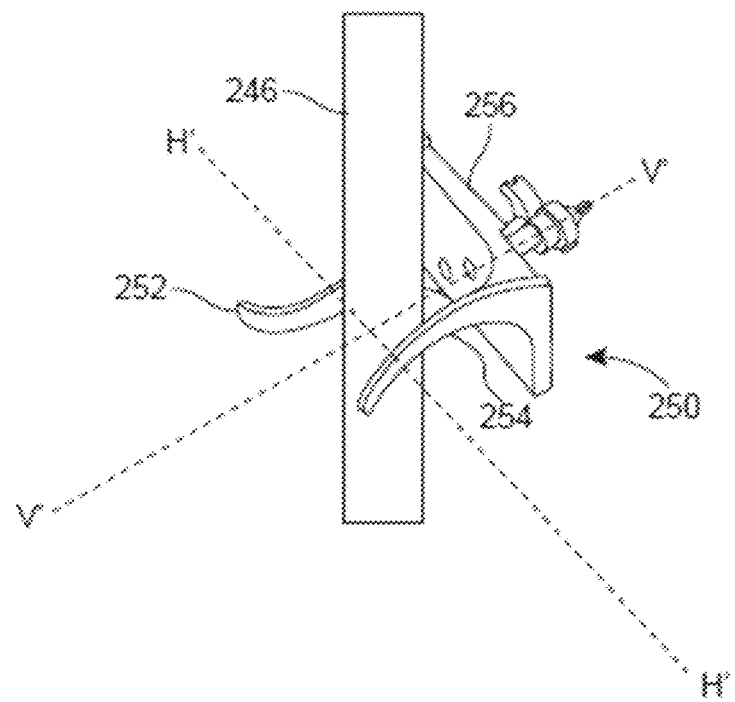
FIG. 5 is an illustration of a further alternative embodiment of the spray nozzle suitable for use in the apparatus illustrated in FIG. 1 where the spray nozzle in an engage/release position.

A further alternative embodiment of spray nozzle 250 is illustrated in FIGS. 5 and 15*b*. In this embodiment, the spray nozzle 250 has two curved spray tubes 252, 254 which, in this example, have a first portion which each extend along opposite sides of a generally rectangular manifold plate 256 and a second portion which extends outwardly from diagonally opposite corners of the manifold plate 256. The second portions of the tubes 252, 254 extend initially in a direction which is perpendicular to the manifold plate 256 (both tubes 252, 542 extending outwardly from the same side of the manifold plate 256) and then curve inwardly with respect to the manifold plate 256 back towards the first portions, so that the tubes 252, 254 both lie along an arc around a nozzle axis H' which is parallel to two of the edges of the manifold plate 256, and spaced from the manifold plate 256. As such, the tubes 252, 254 curve around the nozzle axis H' so that when viewed parallel to the axis H', the axis H' is surrounded completely, or almost completely, by the tubes 252, 254.

Figure 6:
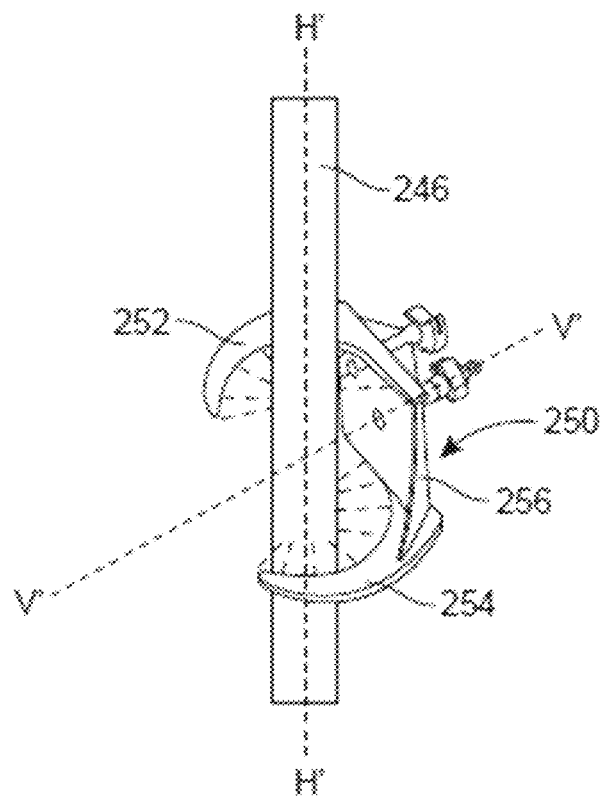
FIG. 6 is an illustration of a further alternative embodiment of the spray nozzle suitable for use in the apparatus illustrated in FIG. 1 where the spray nozzle in an operative position.

The ends of both tubes 252, 254 are closed, and are provided with a plurality of apertures on their inward facing (i.e. facing towards the nozzle axis H') surfaces. An inlet port is provided in the manifold plate 256, and is connected to the interiors of both tubes 252, 254. The inlet port is connected to the fluid flow conduit 214, so that pressurised fluid from the fluid flow conduit 214 enters the tubes 252, 254 via the inlet port and exits the apertures in a series of radially inwardly (i.e. towards the nozzle axis H') directed jets as illustrated in FIG. 6.

The manifold plate 256 is mounted on a holder which is mounted on the end of the second portion 212 of the arm 204, the arm motor being operable to pivot the manifold plate 256 relative to the arm 204 about an axis V' which, in this case, is generally parallel to the second portion 212 of the arm 204. The manifold plate 256 is arranged on the holder such that nozzle axis H' is generally perpendicular to the pivot axis V'.

The cleaning apparatus 200 fitted with this embodiment of spray nozzle 250 may be used to clean around an elongate part 246 such as a wire, cable or tubular in much the same way as the cleaning apparatus 200 fitted with the spray nozzle 240 illustrated in FIGS. 3 and 4, by operating the arm motor 300 to pivot the holder 216, and/or the arm 204 or a portion thereof, such that the nozzle axis H' is perpendicular to the longitudinal axis of the elongate part 246 (the engage/release position). The arm motor 300 can then be operated move the spray nozzle 250 towards the elongate part 246 so that the elongate part 246 passes between the ends of the tubes 252, 254 (as illustrated in FIG. 5) to a position in which the arm motor 300 can be operated to pivot the holder 216 and/or the arm 204 or a portion thereof so that the nozzle axis H' is either generally parallel, or more preferably coincident with the longitudinal axis of the elongate part 246, as illustrated in FIG. 6. In this operative position, when cleaning fluid is pumped along the fluid flow conduit 214 and into the tube 242, the cleaning fluid sprays out of the apertures onto the elongate part 246. As the tubes 252, 254 extend around the entire perimeter of the elongate part 246, cleaning fluid can be directed onto all parts of the outermost surface of the elongate part 246 simply by moving the elongate part 246 parallel to its longitudinal axis. To improve the cleaning effect, the arm motor 300 can be operated to move the spray nozzle 240 parallel to the longitudinal axis of the elongate part 246 in a reciprocating, up and down or back and forth manner whilst the elongate part 246 is moving parallel to its longitudinal axis or is stationery.

It will be appreciated that the provision of a spray nozzle 240, 250 with a plurality of radially inwardly directed jets which are produced by a part or parts which can be arranged to surround the entire or almost the entire perimeter of the part to be cleaned is advantageous, as it may eliminate the need to operate the arm motor 300 or trolley motor 299 to move the spray nozzle 240, 250 around the part to be cleaned.

Whilst this could be achieved using spray nozzle which is circular, placement of a circular spray nozzle around an elongate part, and removal of the spray nozzle from around an elongate part, would be impractical and impossible if an end of the elongate part were not accessible, A split ring nozzle could be used, but by providing a split big enough for the elongate part to pass through would mean that some movement of the spray nozzle around the elongate part would be required to ensure that cleaning fluid is sprayed onto all parts of the outwardly facing surfaces of the elongate part. This problem is solved by the arrangements illustrated in FIGS. 3-6 in which jets of cleaning fluid are ejected from parts which curve around a nozzle axis but which are spaced from one another generally parallel to the nozzle axis.

It should be appreciated that, whilst in the embodiments described above, rotation of the spray nozzle 240, 250 between the engage/release position (in which the nozzle axis H, H' is generally perpendicular to the longitudinal axis of the elongate part to be cleaned) and the operative position (in which the nozzle axis H, H' is generally parallel to the longitudinal axis of the elongate part to be cleaned) can be achieved by operating the arm motor 300 to pivot the spray nozzle 240, 250 relative to the arm 204, the spray nozzle 240. 250 need not be pivotally mounted on the arm 204. In this case, rotation of the spray nozzle 240, 250 between the engage/release position and the operative position could be achieved by operating the arm motor 300 to pivot the arm 204 relative to the base 202.

It will be appreciated that the arm motor 300 may comprise a single motor which is operable to causes pivoting about each pivot axes, X, Y, Z, W, V, or V' independently of the others, or may comprise a plurality of separate motors each of which is operable to cause pivoting about one or more of the pivot axes X, Y, Z, W, V, V'. The term "motor" is therefore intended to cover either a single motor, or a plurality of motors.

What is claimed is:

1. A method of washing a drill string having a longitudinal axis and comprising a plurality of pipe sections which are joined end to end, and a bottom hole assembly which is arranged at a lowermost end of a lowest of the plurality of pipe sections, the method comprising:
    providing a cleaning apparatus comprising,
        a base,
        an arm, the base being configured to support the arm on a drill floor of a drilling rig, the arm comprising a first end which is mounted on the base, a second end at which a spray nozzle is arranged, and at least one articulated joint via which the arm, or a portion of the arm, can pivot relative to the base,
        a fluid flow conduit which is connected to the spray nozzle so that a pressurized fluid entering the fluid flow conduit can spray out of the spray nozzle, and
        at least one motor which is configured to pivot the arm about the at least one articulated joint so as to alter an orientation of the spray nozzle relative to the base;
    using an elevator to lift the drill string through an aperture in the drill floor;
    using the elevator to suspend the bottom hole assembly above the drill floor; and
    using the cleaning apparatus with the base on top of the drill floor to spray a cleaning fluid as the pressurized fluid onto the bottom hole assembly,
    wherein,
    the at least one motor is operated so as to move the spray nozzle relative to the drill floor in order to direct the cleaning fluid onto a plurality of areas of the bottom hole assembly.

2. The method as recited in claim 1, wherein,
    the plurality of pipe sections includes a first pipe section and a second pipe section, the second pipe section being arranged directly below the first pipe section, and
    the method further comprises:
    using the elevator to lift the drill string so that a joint between the first pipe section and the second pipe section is above the drill floor;
    setting slips so that an uppermost end of the second pipe section is supported by the drill floor;
    using the cleaning apparatus to spray the cleaning fluid onto a lowermost end of the first pipe section and onto an uppermost end of the second pipe section, wherein the at least one motor is operated so as to move the spray nozzle relative to the drill floor in order to direct the cleaning fluid onto the plurality of areas of the first pipe section and the second pipe section, and disconnecting the first pipe section from the second pipe section.

3. The method as recited in claim 2, further comprising:
connecting the uppermost end of the second pipe section to the elevator;
releasing the slips and using the elevator to lift the second pipe section through the aperture in the drill floor; and
using the cleaning apparatus to spray the cleaning fluid onto the second pipe section as it is lifted, wherein the at least one motor is operated so as to move the spray nozzle relative to the drill floor in order to direct the cleaning fluid onto the plurality of areas of the second pipe section.

4. The method as recited in claim 3, wherein the first end of the arm of the cleaning apparatus is pivotally mounted on the base.

5. The method as recited in claim 1, wherein the cleaning apparatus further comprises:
a holder which is pivotally connected to the second end of the arm, the holder being configured to have the spray nozzle be mounted thereon,
wherein,
the at least one motor is further configured to pivot the spray nozzle relative to the arm.

6. The method as recited in claim 1, wherein the base of the cleaning apparatus comprises wheels or tracks which, when the base is resting on the drill floor of the drilling rig, are configured to move the base and arm around the drill floor.

7. The method as recited in claim 1, wherein the spray nozzle of the cleaning apparatus comprises,
at least two spray parts each of which extend around a portion of a nozzle axis, the at least two spray parts being spaced from one another in a direction which is generally parallel to the nozzle axis, and
a plurality of fluid exit apertures which are arranged so that the pressurized fluid ejected from the plurality of fluid exit apertures forms jets generally towards the nozzle axis from a plurality of different directions.

8. The method as recited in claim 7, wherein,
the at least one motor is further configured to pivot the spray nozzle between a first position and a second position, and
the nozzle axis rotates through approximately 90° during the pivot of the spray nozzle between the first position and second position.

9. A method of washing a drill string having a longitudinal axis and comprising a plurality of pipe sections which are joined end to end, wherein, the plurality of pipe sections includes a first pipe section and a second pipe section, the first pipe section is an uppermost pipe section, and the second pipe section is directly below the first pipe section, the method comprising:
a) using an elevator to lift a drill string through an aperture in a drill floor;
b) providing a cleaning apparatus comprising,
a base,
an arm, the base being configured to support the arm on the drill floor of a drilling rig, the arm comprising a first end which is mounted on the base, a second end at which a spray nozzle is arranged, and at least one articulated joint via which the arm, or a portion of the arm, can pivot relative to the base,
a fluid flow conduit which is connected to the spray nozzle so that a pressurized fluid entering the fluid flow conduit can spray out of the spray nozzle, and
a motor which is configured to pivot the arm about the at least one articulated joint so as to alter an orientation of the spray nozzle relative to the base;
c) using the cleaning apparatus which is arranged so that the base of the cleaning apparatus is on top of the drill floor to spray a cleaning fluid as the pressurized fluid onto a first pipe section as the first pipe section is lifted, wherein the motor is operated so as to move the spray nozzle relative to the drill floor in order to direct the cleaning fluid onto a plurality of areas of the first pipe section;
d) using the elevator to lift the drill string so that a joint between the first pipe section and the second pipe section is above the drill floor;
e) setting slips so that an uppermost end of the second pipe section is supported by the drill floor;
f) disconnecting the first pipe section from the second pipe section; and
g) using the cleaning apparatus to spray the cleaning fluid onto a lowermost end of the first pipe section, wherein the motor is operated so as to move the spray nozzle relative to the drill floor in order to direct the cleaning fluid onto the plurality of areas of the first pipe section.

10. The method as recited in claim 9, further comprising:
h) moving the first pipe section from its position above the second pipe section; and
i) using the cleaning apparatus to spray the cleaning fluid onto an uppermost end of the second pipe section, wherein the motor is operated so as to move the spray nozzle relative to the drill floor in order to direct the cleaning fluid onto a plurality of areas of the second pipe section.

11. The method as recited in claim 10, further comprising:
j) connecting the uppermost end of the second pipe section to the elevator;
k) releasing the slips and using the elevator to lift the second pipe section through the aperture in the drill floor; and
l) using the cleaning apparatus to spray the cleaning fluid onto the second pipe section as it is lifted, wherein the motor is operated so as to move the spray nozzle relative to the drill floor in order to direct the cleaning fluid onto the plurality of areas of the second pipe section.

12. The method as recited in claim 11, wherein any of steps c), g), i) and l) comprise(s) operating the motor to pivot the at least one articulated joint so as to move the spray nozzle relative to the base.

13. The method as recited in claim 11, wherein any of steps c), g), i) and l) comprise(s) operating the motor to pivot the at least one articulated joint so as to move the spray nozzle around at least a portion of a circumference of the first pipe section and the second pipe section, as the case might be.

14. The method as recited in claim 11, wherein,
the base of the cleaning apparatus comprises wheels or tracks which are configured, via a trolley motor, to move the base and the arm around the drill floor, and
any of steps c), g), i) and l) comprise(s) operating the trolley motor so as to move the cleaning apparatus around the first pipe section and the second pipe section, as the case might be, so as to spray the cleaning fluid into a plurality of sides of the first pipe section and into a plurality of sides of the second pipe section, as the case might be.

15. The method as recited in claim 11, wherein any one of steps c), g), i) or l) comprise(s) operating the motor so as to move the spray nozzle in a reciprocating manner in a direction which is generally parallel to the longitudinal axis of the drill string.

16. The method as recited in claim 11, wherein,
the spray nozzle of the cleaning apparatus comprises,
    at least two spray parts each of which extend around a portion of a nozzle axis, the two spray parts being spaced from one another in a direction which is generally parallel to the nozzle axis, and
    a plurality of fluid exit apertures which are arranged so that the pressurized fluid ejected from the plurality of fluid exit apertures forms jets generally towards the nozzle axis from a plurality of different directions,
the motor is further configured to pivot the spray nozzle between a first position and a second position,
the nozzle axis rotates through approximately 90° during the pivot of the spray nozzle between the first position and second position, and
any one of steps c), g), i) or l) comprises operating the motor so as to pivot the spray nozzle to an engage/release position in which the nozzle axis is generally perpendicular to a longitudinal axis of the drill string, wherein the motor is operated so as to move the spray nozzle towards the drill string so that the drill string lies between the at least two spray parts, and wherein the motor is operated so as to pivot the spray nozzle to an operative position in which the nozzle axis is generally parallel to or generally coincident with the longitudinal axis of the drill string.

17. A method of cleaning an elongate part having a longitudinal axis using a cleaning apparatus, wherein,
the cleaning apparatus comprises:
    a base;
    an arm, the base being configured to support the arm on a drill floor of a drilling rig, the arm comprising a first end which is mounted on the base, a second end at which a spray nozzle is arranged, and at least one articulated joint via which the arm, or a portion of the arm, can pivot relative to the base;
    a fluid flow conduit which is connected to the spray nozzle so that a pressurized fluid entering the fluid flow conduit can spray out of the spray nozzle; and
    a first motor which is configured to pivot the arm about the at least one articulated joint so as to alter an orientation of the spray nozzle relative to the base,
wherein,
the spray nozzle of the cleaning apparatus comprises,
    at least two spray parts each of which extend around a portion of a nozzle axis, the at least two spray parts being spaced from one another in a direction which is generally parallel to the nozzle axis, and
    a plurality of fluid exit apertures which are arranged so that the pressurized fluid ejected from the plurality of fluid exit apertures forms jets generally towards the nozzle axis from a plurality of different directions,
a second motor is further configured to pivot the spray nozzle between a first position and a second position, and
the nozzle axis rotates through approximately 90° during the pivot of the spray nozzle between the first position and second position;
the method comprising:
operating the second motor so as to pivot the spray nozzle to an engage/release position in which the nozzle axis is generally perpendicular to a longitudinal axis of the drill string, wherein the first motor is operated so as to move the spray nozzle towards the drill string so that the drill string lies between the at least two spray parts; and
operating the second motor so as to pivot the spray nozzle to an operative position in which the nozzle axis is generally parallel to or generally coincident with the longitudinal axis of the drill string.

18. The method as recited in claim 17, further comprising:
pumping the cleaning fluid into the fluid flow conduit so that the cleaning fluid sprays out of the spray nozzle when the spray nozzle is in the operative position.

19. The method as recited in claim 18, further comprising:
operating the first motor so as to move the spray nozzle in a reciprocating manner in a direction which is generally parallel to the longitudinal axis of the drill string while the spray nozzle is in the operative position and cleaning fluid is being pumped into the fluid flow conduit.

* * * * *